UNITED STATES PATENT OFFICE.

LUKE HOUZE, OF MONTEREY, CALIFORNIA, ASSIGNOR OF FOURTEEN-SIXTIETHS TO R. H. WILLEY, FOURTEEN-SIXTIETHS TO ARTHUR BRANQUART, AND FOURTEEN-SIXTIETHS TO CHARLES F. NIKLAUS, OF MONTEREY, CALIFORNIA.

COMPOSITION FOR BRICK, &c., AND PROCESS OF MAKING SAME.

No. 875,662.	Specification of Letters Patent.	Patented Dec. 31, 1907.

Application filed November 6, 1906. Serial No. 342,298.

*To all whom it may concern:*

Be it known that I, LUKE HOUZE, a citizen of the United States, residing at Monterey, county of Monterey, State of California, have invented a new and useful Composition for Bricks, &c., and Processes of Making Same, of which the following is a specification.

This invention relates to a composition for brick, building blocks, tiles and other structural material and its main object is to provide a material for this purpose, which, while having the full strength of the material ordinarily used therefor, will have greater heat resisting capacity.

A further object of the invention is to provide a material for such purposes which will neither absorb nor transmit heat in any substantial degree.

Another object of the invention is to provide a material for the above purposes which will not materially expand or contract when exposed to heat or cold.

The main constituent and basis of the composition is a certain rock abundant in Monterey county, State of California, and doubtless in other places, said rock consisting of a hydrous silicate of aluminium which when treated as hereinafter set forth produces an artificial cement of remarkable properties. The analysis of said rock is as follows:—

| | |
|---|---:|
| Silica | 65.48 |
| Aluminum and iron oxid | 9.06 |
| Magnesium oxid | 1.31 |
| Chlorin | 2.50 |
| Sodium oxid | 4.37 |
| Loss on ignition (water) | 17.17 |

The specific gravity of the rock determined by weighing a given bulk of the same in a finely pulverized state is about 1.85.

The composition consists of the above constituent as a base or filler and a binder therefor, said binder consisting of plastic fire-clay.

For making brick the above described rock (or a mixture or combination of its mechanical parts) is first ground coarse. It is then calcined and pulverized, pulverization being effected before or after the calcination and the calcination being at a sufficient heat to drive off the water contained in the rock. The calcined pulverized rock is then thoroughly wet mixed or puddled with any first class fire clay in proportion of 20 to 25 per cent. clay (according to the plastic quality of same) and from 75 to 80 per cent. of the pulverized rock or ingredient as above described. It is then molded; then repressed; and then allowed to dry in the same manner as ordinary face brick. The brick is then kiln burned to a temperature of about 2200° F. such heat being maintained upon each brick for a period not less than twenty-four hours.

The brick, made as above described, is of great strength as regards both tension and compression and is of unusually fine appearance, being a light colored brick, of smooth texture, and being absolutely free from warping or shrinking, so that it is adapted for use as a face brick or as ordinary brick. Its weight is about one-half of that of ordinary brick and less than one-half the weight of ordinary face brick. It is substantially unaffected by heat even at an extremely high temperature, up to say 3000° F. Moreover it does not transmit heat to any substantial extent, it having such a degree of heat resistance and non-transmission as to admit of one end of the brick being held in the naked hand when the other end has been exposed to the direct action of flame at from 2500° to 3000° of heat for from ten to twenty-four hours continuously. The coefficient of expansion of the brick with heat is extremely low.

The composition is suitable for forming not only brick but building blocks of various shapes and sizes, pipe, tile either for hearth or for building purposes, or the hollow tile used for floors and partitions; in fact for any purpose for which terra-cotta brick or stone is now used for building purposes.

What I claim is:—

1. A composition for brick, etc. consisting of divided rock of substantially the composition above stated and having a specific gravity of about 1.85 with a binder of fire-clay.

2. A composition for brick, etc. consisting of rock of substantially the composition stated, and having a specific gravity of about 1.85 in a divided condition, and a binder of fire-clay in the proportion of 75 to 80 per cent. of rock and 25 to 20 per cent. of the fire-clay.

3. The process of forming a composition brick which consists in pulverizing and calcining rock of substantially the composition stated, and having a specific gravity of about 1.85 mixing the same with fire-clay in the proportion of substantially 75 to 80 per cent. of the rock and 25 to 20 per cent. of the clay, molding and burning.

In testimony whereof, I have hereunto set my hand at Monterey, Calif., this 16th day of October, 1906.

LUKE HOUZE.

Witnesses:
W. C. LITTLE,
E. A. LA VALLEE.